May 29, 1945.  R. J. PATTERSON  2,377,100
EDUCATIONAL APPLIANCE
Filed May 15, 1944
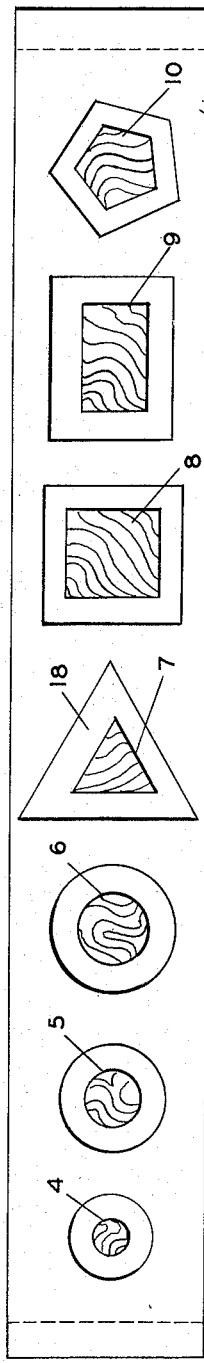
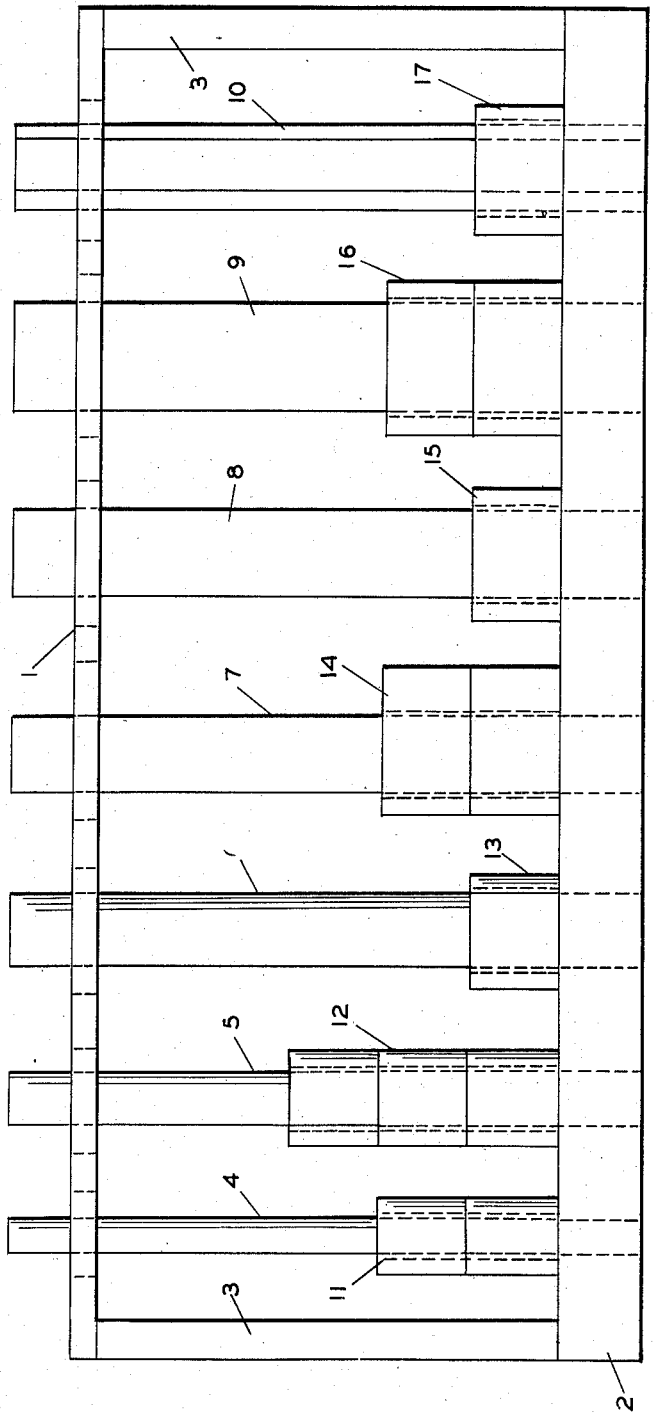
INVENTOR
R. J. PATTERSON
BY Hudson + Young
ATTORNEY Patented May 29, 1945

2,377,100

UNITED STATES PATENT OFFICE 2,377,100

EDUCATIONAL APPLIANCE

Robert J. Patterson, Bartlesville, Okla.

Application May 15, 1944, Serial No. 535,690

5 Claims. (Cl. 35—22)

This invention relates to an educational appliance which may be used for teaching shape, size, geometrical form and three-dimensional concepts to children. It may also be employed for testing aptitudes. While it is more especially adapted to use for educational purposes, it may at the same time function as a toy or amusement device.

The principal object of the present invention is to provide an improved educational device. Another object is to provide such a device which may be used for teaching concepts of shape, size, geometrical form and the like to children or for determining mechanical aptitude. Another object is to provide such a device which is cheaply and easily manufactured. Another object is to provide such an appliance which may be constructed of cheap and readily available materials. Another object is to provide such an appliance which may also be employed for teaching different colors and shades of colors or for teaching letters, numerals, pictorial representations and the like. Numerous other objects will more fully hereinafter appear.

The accompanying drawing portrays diagrammatically a preferred embodiment of the present invention. Figure 1 is a top plan view and Figure 2 is a side elevation of the device with some of the removable hollow sleeves in place.

The educational device of the present invention comprises a flat member having a plurality of openings therein and a corresponding number of rods of varying cross-sectional configuration rigidly mounted with respect to the flat member and extending therethrough, the openings being sufficiently larger than the rods to form annular spaces which accommodate hollow sleeves placed on the rods and allow movement of these sleeves axially along the rods between the outer surfaces of the rods and the inner walls of the openings. A plurality of hollow sleeves, at least one and usually several for each of the rods, are provided. These sleeves have transverse cross-sections which correspond to the annular spaces formed between the rods and the inner walls of the openings and are adapted to be placed over the respective rods and moved axially along the rods through the annular spaces into a position on the other side of the flat member.

It is preferred that each of the annular spaces be of such configuration that each hollow sleeve can be accommodated by its respective rod alone and by no other rod. It is also preferred that each rod extend beyond the flat member sufficiently that the extending portion act as an initial guide for the sleeve so that the child being educated or individual being tested may more easily initiate passage of the sleeve through the opening and may also discover that conformity of the inner surface of the sleeve to the outer surface of the rod is independent of conformance of the outer surface of the sleeve to the inner surface of the opening, it being within the purview of the present invention to have two or more rods of identical cross-section passing through openings of varying shape so that while the inner surfaces of the sleeves are identical, the outer surfaces are different with the consequence that each sleeve can be accommodated only by the proper rod and opening.

While the inner surfaces of the openings are in most cases concentric with the outer surfaces of the rods this is not essential and the arrangement may be such that one or more of the sleeves have outer surfaces which are not concentric with respect to the inner surfaces thereof. As an example of the infinite possibilities of such an arrangement, a square rod may pass through a circular opening in which case the sleeve has a square inward surface and a round outer surface. Or the arrangement may be such that the sleeve is insertable through the annular space only when it is in a single position of angular adjustment with respect to the rod and/or opening. An example of such an arrangement is the triangular sleeve 14 with one thickened side shown in the drawing. Another example is a keyed circle.

It is preferred to construct the device in the form of an open frame so that the child can see the sleeves in place on the rods and manipulate them as he desires. Ordinarily such a frame is of rectangular configuration, being constructed of flat members namely a base member in which the rods are rigidly mounted, a top member having the openings through which the rods project and two side members rigidly connecting the top and base members in such a manner as to permanently maintain these parts in fixed relationship. If desired, wheels may be attached to the base member to make a wheeled toy.

The sleeves, and likewise the rods, may be of different colors or different shades of the same color whereby color concepts are additionally taught. If desired, they may be provided with indicia such as letters, numerals or pictures on their sides, the outer faces of polygonal sleeves being particularly adapted to such usage.

The frame, rods and sleeves may be made of any suitable constructional material. Ordinarily it is preferred to construct the frame of wood, the rods of wood or plastic and the sleeves of plastic inasmuch as plastic lends itself to extrusion in the form of rods and sleeves. Plastic sleeves are preferable to sleeves of wood since hollow wood is fragile whereas hollow plastic is strong and tough.

Referring to the drawing, the educational device comprises an open frame made up of flat members joined at their ends in any suitable manner. These comprise top member 1, base member 2 and side members 3. Rods 4 to 10 are rigidly mounted at their lower ends in any suitable way and extend upwardly through larger concentric holes in top member 1, projecting above the upper surface thereof to form a guide for placement of the sleeves. Rods 4 to 10 are of different sizes and cross-sectional shapes. Thus rods 4 to 6 are circular in cross-section and of progressively increasing diameter. Rod 7 is triangular, 8 is square, 9 is rectangular and 10 is pentagonal. Any other geometrical shapes may be employed. The rods may be of any desired length to accommodate any desired number of sleeves.

A plurality of sleeves 11 to 17 are provided for rods 4 to 10 respectively. The outer periphery of these sleeves corresponds to the holes in top member 1 while the inner periphery corresponds to the outside periphery of rods 4 to 10 whereby the sleeve for each rod can be slid over that rod alone and none of the others.

If desired, the holes and sleeves may be so designed that the sleeve can be inserted only when it is in a single angular position with respect to the rod, as illustrated in the case of rod 7 and sleeve 14 wherein the triangular sleeve 14 has one thick side as indicated at 18.

It will be obvious that the outside dimensions of the sleeves are sufficiently smaller than the inner dimensions of the apertures in member 1 and the inner dimensions of the sleeves are sufficiently larger than the outer dimensions of the rods that the sleeves slidably engage both the holes and rods with adequate but not excessive clearance so that the sleeves may be easily telescopically moved along the rods.

In operation, the empty frame is given to the child or subject with a supply of the sleeves. The sleeves are placed on the appropriate rods and slid into position within the frame, any desired number being stacked on each rod. After the desired number of sleeves have been placed on the rods the frame is inverted whereupon the sleeves fall off by gravity.

A number of advantages of the educational appliance described in the foregoing will be apparent to those skilled in the art. The device teaches concepts of shape, size, geometrical form and the like in a novel and advantageous manner. The child is taught fundamental mechanical conceptions in an interesting and entertaining manner, since he is compelled not only to make the inner surface of the sleeve correspond to the outer surface of the rod but also to make the outer surface of the sleeve conform to the inner walls of the openings. At the same time he may be taught concepts of color and other concepts by virtue of the coloration and/or marking of the sleeves or rods. Furthermore, the device is well adapted to the testing of mechanical or other aptitudes. The device is simple and economical to manufacture and may be made of cheap and readily available raw materials. The construction is rugged and adapted to long life.

While one embodiment of the invention has been described in detail for purposes of illustration, it will be understood that many modifications of the main inventive concept may be made without departing from the principle of the invention, and that the invention is to be taken as limited only by the language of the appended claims.

I claim:

1. An educational appliance comprising, in combination, an open rectangular frame made of flat members including a top member, a base member parallel thereto, and side members connecting said top and base members to form said frame, said top member having a plurality of openings therein, a corresponding number of rods of varying cross-section mounted rigidly in said base member and extending through said openings, said openings being sufficiently larger than said rods to accommodate hollow sleeves placed on the rods and allow movement thereof along the rods between the outer surfaces of said rods and the inner walls of said openings, and a plurality of hollow sleeves, at least one for each of said rods, said sleeves having cross-sections corresponding to the spaces between said rods and the inner walls of said openings and adapted to be placed over the respective rods and moved along said rods through said spaces into a position within said frame.

2. An educational appliance comprising, in combination, an open rectangular frame made of flat members including a top member, a base member parallel thereto, and side members connecting said top and base members to form said frame, said top member having a plurality of openings therein, a corresponding number of rods of varying cross-section mounted rigidly in said base member and extending through said openings to a point sufficiently on the outward side of said top member that the extending portion acts as a guide for the placement of the hollow sleeves hereinafter mentioned, said openings being sufficiently larger than said rods to accommodate hollow sleeves placed on the rods and allow movement thereof along the rods between the outer surfaces of said rods and the inner walls of said openings, and a plurality of hollow sleeves, at least one for each of said rods, said sleeves having cross-sections corresponding to the spaces between said rods and the inner walls of said openings and adapted to be placed over the respective rods and moved along said rods through said spaces into a position within said frame.

3. An educational appliance comprising, in combination, an open rectangular frame made of flat members including a top member, a base member parallel thereto, and side members connecting said top and base members to form said frame, a plurality of rods of varying cross-section rigidly mounted in said base member and extending vertically upwardly through accommodating openings in said top member to a point sufficiently thereabove that the extending portion acts as a guide for the placement of the hollow sleeves hereinafter mentioned, said openings being sufficiently larger than said rods to accommodate hollow sleeves placed on the rods and allow vertical movement thereof between the outer surfaces of said rods and the inner walls of said openings, and a plurality of hollow sleeves, at least one for each of said rods, said sleeves having horizontal cross-sections corresponding to the spaces between said rods and the inner walls of said openings and adapted to be placed over the respective rods and moved vertically on said rods through said spaces into a position within said frame, each of said sleeves fitting its respective rod and none of the others.

4. An educational appliance comprising, in combination, an open rectangular frame made of flat members including a top member, a base member parallel thereto, and side members connecting said top and base members to form said frame, said top member having a plurality of openings therein, a corresponding number of rods of varying cross-section mounted rigidly in said base member and extending through said openings, said openings being sufficiently larger than said rods to accommodate hollow sleeves placed on the rods and allow movement thereof along the rods between the outer surfaces of said rods and the inner walls of said openings, at least one of said openings having its inner walls non-concentric with respect to the outer surface of its respective rod, and a plurality of hollow sleeves, at least one for each of said rods, said sleeves having cross-sections corresponding to the spaces between said rods and the inner walls of said openings and adapted to be placed over the respective rods and moved along said rods through said spaces into a position within said frame.

5. An educational appliance comprising, in combination, an open frame embodying an upper member having a plurality of openings therein and a base member spaced from said upper member, said upper member having a plurality of openings therein, a corresponding number of rods of varying cross-section mounted rigidly in said base member and extending through said openings, said openings being sufficiently larger than said rods to accommodate hollow sleeves placed on the rods and allow movement thereof along the rods between the outer surfaces of said rods and the inner walls of said openings, and a plurality of hollow sleeves, at least one for each of said rods, said sleeves having cross-sections corresponding to the spaces between said rods and the inner walls of said openings and adapted to be placed over the respective rods and moved along said rods through said spaces into a position within said frame.

ROBERT J. PATTERSON.